United States Patent
Choi et al.

(10) Patent No.: US 8,188,864 B2
(45) Date of Patent: May 29, 2012

(54) DEVICE AND METHOD FOR INSPECTING EQUIPMENT

(75) Inventors: Yong Hoon Choi, Daejeon (KR); Hoon Jung, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 487 days.

(21) Appl. No.: 12/533,301

(22) Filed: Jul. 31, 2009

(65) Prior Publication Data

US 2010/0026497 A1    Feb. 4, 2010

(30) Foreign Application Priority Data

Aug. 1, 2008 (KR) .................. 10-2008-0075463

(51) Int. Cl.
G08B 13/14 (2006.01)
(52) U.S. Cl. .................. 340/572.1; 340/568.1
(58) Field of Classification Search ............ 340/572.1, 340/568.1; 700/244; 705/307; 709/224, 709/229
See application file for complete search history.

(56) References Cited

U.S. PATENT DOCUMENTS

| | | | |
|---|---|---|---|
| 6,847,892 B2 * | 1/2005 | Zhou et al. | 701/408 |
| 6,917,853 B2 * | 7/2005 | Chirnomas | 700/244 |
| 6,934,532 B2 * | 8/2005 | Coppinger et al. | 455/412.1 |
| 7,042,356 B2 * | 5/2006 | Kent | 340/568.1 |
| 7,587,467 B2 * | 9/2009 | Hesselink et al. | 709/214 |
| 7,958,226 B2 * | 6/2011 | Bernardi et al. | 709/224 |
| 2003/0033410 A1 | 2/2003 | Kobayashi | |
| 2003/0120509 A1 * | 6/2003 | Bruch et al. | 705/1 |

FOREIGN PATENT DOCUMENTS

| | | |
|---|---|---|
| JP | 2005-190299 | 7/2005 |
| JP | 2008-191725 | 8/2008 |
| KR | 10-0489849 | 5/2005 |
| KR | 10-2005-0113323 | 12/2005 |
| KR | 10-2006-0027084 | 3/2006 |
| KR | 10-2007-0112641 | 11/2007 |
| KR | 10-0802096 | 1/2008 |

* cited by examiner

*Primary Examiner* — John A Tweel, Jr
(74) *Attorney, Agent, or Firm* — Staas & Halsey LLP

(57) ABSTRACT

An equipment inspecting device for inspecting at least one piece of equipment positioned in an office from among a plurality of offices included in the equipment inspection target recognizes office information for indicating a position of an office, and searches office equipment information for indicating a previous state of at least one piece of equipment positioned in the office by using the office information. The equipment inspecting device transmits the searched office equipment information to the equipment information collecting device so that an equipment information collecting device for collecting at least one piece of equipment information corresponding to at least one piece of equipment may generate update information for indicating a state change of at least one piece of equipment. Also, the equipment inspecting device receives the update information from the equipment information collecting device, and updates office equipment information by using the update information.

18 Claims, 12 Drawing Sheets

DEVICE AND METHOD FOR INSPECTING EQUIPMENT

CROSS-REFERENCE TO RELATED APPLICATION

This application claims priority to and the benefit of Korean Patent Application No. 10-2008-0075463 filed in the Korean Intellectual Property Office on Aug. 1, 2008, the entire contents of which are incorporated herein by reference.

BACKGROUND OF THE INVENTION (a) Field of the Invention

The present invention relates to an equipment inspecting method and a device thereof. Particularly, the present invention relates to an equipment inspecting device for inspecting a device by using a radio frequency identification (RFID) tag and a method thereof.

(b) Description of the Related Art

It is needed to manage usage position and usage information for a large amount of many kinds of computing devices provided within a remote building. Here, examples of the computing devices include a PC, a monitor, a PDA, a printer, and a barcode reader.

In order to manage the computing devices, a user is generally sent directly to the field to manually detect the condition of the computing devices. When the computing devices are manually managed, time and cost are wasted. Particularly, large workplaces have many devices to thereby expend much time and cost. Further, since it is difficult for the user to sense a device that is small or is positioned at an isolated place, the accuracy of checking the current states of the device is problematically reduced.

In addition, a method for remotely managing the devices through the network is applicable to some devices for providing a network system in cooperation with the network resource management system (NRMS). However, the NRMS using management method cannot be applicable to a device that does not provide a network system or a device that does not always provide a network system.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an equipment inspection method and device having advantages of relative accuracy and that can quickly inspect a large quantity of many kinds of equipment compared to the conventional manual equipment inspection method.

An exemplary embodiment of the present invention provides a method for an equipment inspecting device to inspect at least one piece of equipment positioned in an office from among a plurality of offices included in an equipment inspection target, the method comprising: recognizing office information for indicating a position of the office; searching office equipment information for indicating a previous state of at least one piece of equipment positioned in the office by using the recognized office information; transmitting the searched office equipment information to an equipment information collecting device that collects at least one piece of equipment information corresponding to the at least one piece of equipment; receiving update information from the equipment information collecting device, the update information indicating a state change of the at least one piece of equipment; and updating the office equipment information by using the update information.

The at least one piece of equipment information is stored in at least one radio frequency identification tag corresponding to the at least one piece of equipment.

The at least one piece of equipment information includes: identification information for identifying the corresponding equipment; position information for indicating a position of the corresponding equipment in the office; and current usage information for indicating a current usage state of the corresponding equipment.

The recognizing of office information includes: receiving building information for indicating an address of the building in which the office is positioned from the equipment information collecting device; searching drawing information corresponding to the received building information from among a plurality of drawing information for indicating blueprints of at least one building in which the plurality of offices are positioned; transmitting the searched drawing information to the equipment information collecting device so that the equipment information collecting device may generate the office information; and receiving the office information from the equipment information collecting device.

The recognizing of office information includes receiving the office information from the equipment information collecting device having received the office information stored in an office radio frequency identification tag corresponding to the office.

The recognizing of office information includes receiving the office information stored by the equipment information collecting device positioned in the office from the equipment information collecting device.

The method further includes generating history information for indicating a history for updating the office equipment information according to the update information.

Another embodiment of the present invention provides a device for inspecting equipment corresponding to a plurality of offices included in an equipment inspecting target, including: a communication server for inspecting equipment in cooperation with an equipment information collecting device and transmitting/receiving information to/from the equipment information collecting device through a radio frequency communication network, the equipment information collecting device collecting at least one piece of equipment information stored in at least one radio frequency identification tag corresponding to at least one piece of equipment positioned in each office and generating update information for indicating a state change of the at least one piece of equipment; an equipment information server for controlling a plurality of pieces of office equipment information for indicating a previous state of at least one piece of equipment positioned in each office corresponding to the plurality of offices; and a control server for updating the office equipment information stored in the equipment information server according to the update information received from the equipment information collecting device through the communication server.

The equipment information server includes: an office equipment database for storing the plurality of pieces of office equipment information; and an equipment searcher for receiving office information for indicating a position of an office selected for inspecting equipment from among the plurality of offices from the equipment information collecting device through the communication server, searching office equipment information corresponding to the received office information from the office equipment database, and transmitting the searched office equipment information to the equipment information collecting device through the communication server.

The at least one piece of equipment information includes: identification information for identifying the corresponding equipment; position information for indicating a position of the corresponding equipment in the office; and current usage information for indicating a current usage state of the corresponding equipment.

The update information is generated by comparing the at least one piece of equipment information received by the equipment information collecting device from the at least one equipment radio frequency identification tag and the office equipment information received from the equipment searcher.

The control server includes: an information updater for applying the update information to a plurality of piece of office equipment information stored in the office equipment database, and generating history information for indicating an update history of the office equipment information; and a history database for storing the history information.

The equipment is inspected in cooperation with an equipment information collecting device realized with part of a mobile station positioned in the office.

The device further includes a building drawing server including: a drawing database for storing at least one piece of drawing information for indicating a design drawing of the at least one building so as to correspond to at least one piece of building information for indicating an address of at least one building in which the plurality of offices are positioned; and a building searcher for receiving building information corresponding to a building in which the office is positioned from the equipment information collecting device through the communication server, searching drawing information corresponding to the received building information from the drawing database, and transmitting the searched drawing information to the equipment information collecting device through the communication server.

The office information is generated by using the drawing information received by the equipment information collecting device from the building searcher.

The office information is received by the equipment information collecting device from an office radio frequency identification tag corresponding to the office from among a plurality of office radio frequency identification tags corresponding to the plurality of offices.

The equipment inspecting device inspects equipment of the office in cooperation with an equipment information collecting device corresponding to the office from among a plurality of equipment information collecting devices corresponding to the plurality of offices.

The office information is stored in the equipment information collecting device corresponding to the office.

DETAILED DESCRIPTION OF THE EMBODIMENTS

Figure 1:
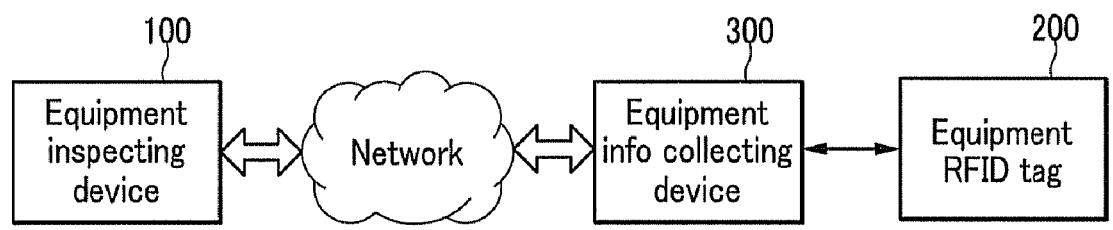
FIG. 1 shows a schematic diagram of an equipment inspecting device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, an equipment inspecting device and method according to an exemplary embodiment of the present invention will be described with reference to accompanying drawings.

FIG. 1 shows a schematic diagram of an equipment inspecting device according to an exemplary embodiment of the present invention.

As shown in FIG. 1, the equipment inspecting device 100 inspects the equipment for respective offices in cooperation with an equipment radio frequency identification (RFID) tag 200 for storing equipment information of corresponding equipment and an equipment information collecting device 300 for collecting equipment information from each equipment RFID tag. Here, the office represents a space in which at least one piece of equipment is positioned.

The equipment inspecting device 100 is a device for controlling at least one piece of office equipment information corresponding to at least one office. In this instance, the office equipment information represents information indicating a previous state of at least one piece of equipment positioned in the office according to the previous inspection result.

The equipment RFID tag 200 corresponds to the equipment and stores equipment information of the corresponding equipment, and it can be attached to the corresponding equipment or can be positioned near the corresponding equipment. Here, equipment information represents unique information of the equipment, and it includes identification information for identifying equipment, position information for indicating a position of the equipment in the office, and information on the current usage state of the equipment. The identification information includes an equipment number, an equipment name, a specification, and an introduction date.

The equipment information collecting device 300 represents a device for collecting at least one piece of equipment information from at least one equipment RFID tag 200 positioned in an office, and it provides an interface between a user who inspects equipment (hereinafter, an inspector) and the equipment inspecting device. That is, the inspector uses the equipment information collecting device 300 to completely recognize the equipment inspection progress items or control equipment inspection.

The equipment information collecting device 300 generates update information for showing a state change of at least one piece of equipment based on office equipment information corresponding to an office and at least one piece of equipment information, and transmits the generated update information to the equipment inspecting device 100. Here, the update information includes a position change of equipment, an existence state of equipment, and an existence state of added equipment.

The equipment inspecting device 100 according to an exemplary embodiment of the present invention will now be described.

Figure 2:
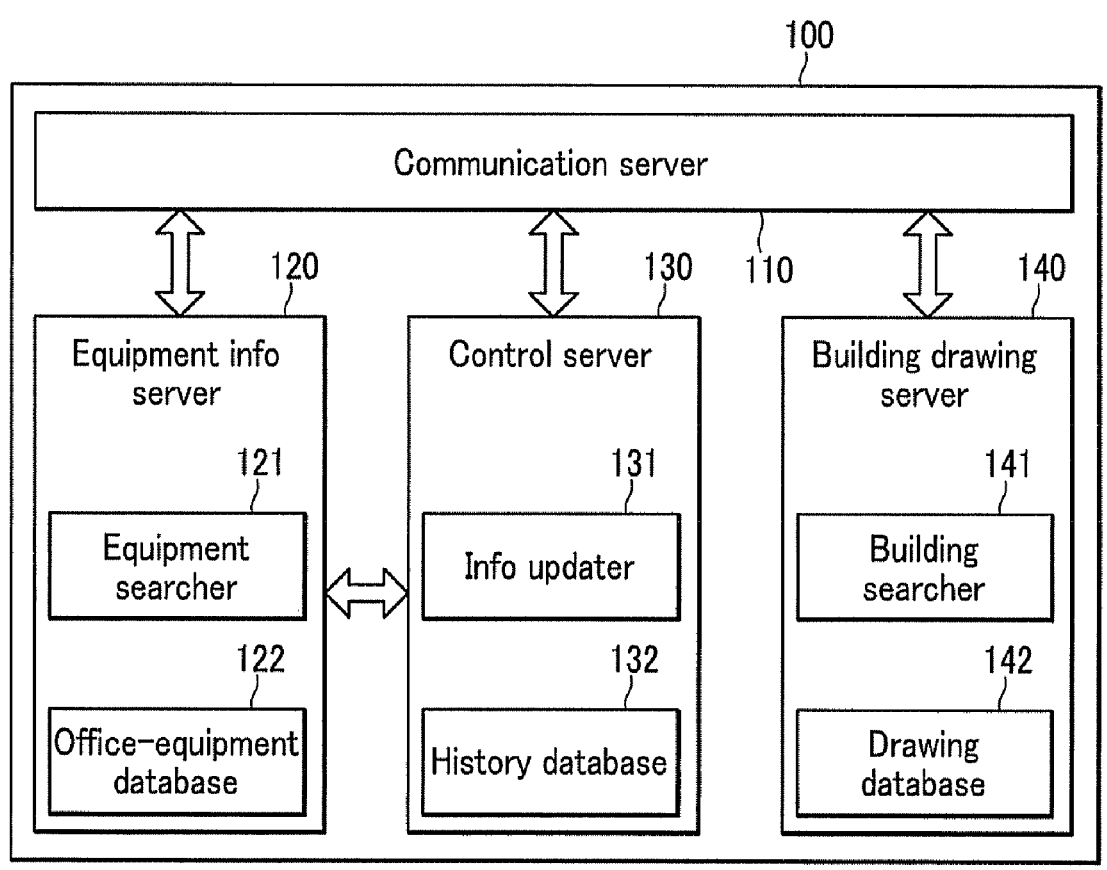
FIG. 2 shows a block diagram of an equipment inspecting device according to an exemplary embodiment of the present invention.

FIG. 2 shows a block diagram of an equipment inspecting device according to an exemplary embodiment of the present invention.

As shown in FIG. 2, the equipment inspecting device 100 includes a communication server 110, an equipment information server 120, a control server 130, and a building drawing server 140.

The communication server 110 represents a module for transmitting/receiving information to/from the equipment information collecting device 300 by using a radio frequency communication network. That is, the communication server 110 receives information from the equipment information collecting device 300, and transmits the information requested by the equipment information collecting device 300 to the equipment information collecting device 300.

The equipment information server 120 controls office equipment information and includes an equipment searcher 121 and an office equipment database 122. The office equipment database 122 stores at least piece of one office equipment information corresponding to at least piece of one office included in the equipment inspection target so as to be linked with office information for showing the position of the office. The equipment searcher 121 uses office information corresponding to an office to search for office equipment information corresponding to the office from the office equipment database 122, and transmits the searched office equipment information to the equipment information collecting device 300 through the communication server 110. In this instance, the office information indicates the position in a building including the office or an address of the office according to the inspector's decision, or the condition of the equipment information collecting device 300.

The control server 130 controls the equipment inspecting device 100, and includes an information updater 131 and a history database 132. The information updater 131 updates the office equipment information stored in the office equipment database 122 according to the update information provided by the equipment information collecting device 300 through the communication server 110. The history database 132 stores history information in which the information updater 131 updates office equipment information. That is, the history database 132 stores an update history of the office equipment information generated from the result of accumulating the process in which the information updater 131 updates the office equipment information for a predetermined time.

The building drawing server 140 controls building information for showing an address of a building in which at least one office included in the equipment inspecting target is positioned, and it includes a building searcher 141 and a drawing database 142. The drawing database 142 stores drawing information for showing a blueprint of the building in linkage with building information in correspondence to at least one building in which at least one office is positioned. The building searcher 141 uses building information corresponding to a building to search for drawing information corresponding to the building from the drawing database 142, and transmits the searched drawing information to the equipment information collecting device 300 through the communication server 110.

In the case of inspecting equipment in linkage with the equipment information collecting device 300 for recognizing office information without drawing information, the equipment inspecting device 100 not including the building drawing server 140 is included in the exemplary embodiment of the present invention. This will be described in detail in the second exemplary embodiment of the present invention and the third exemplary embodiment with reference to FIG. 7 to FIG. 12.

The equipment RFID tag 200 according to the exemplary embodiment of the present invention will now be described.

Figure 3:
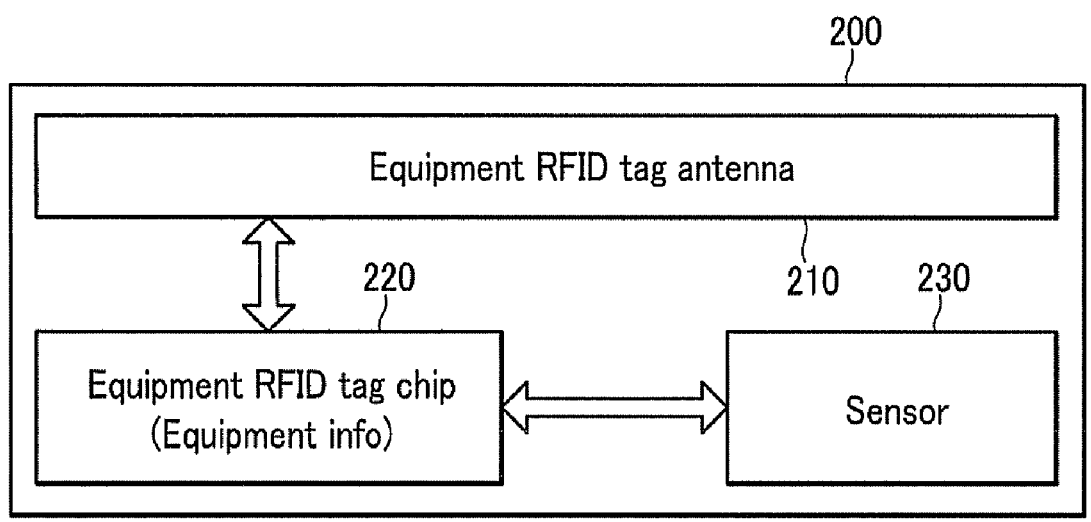
FIG. 3 shows a block diagram of an equipment RFID tag according to an exemplary embodiment of the present invention.

FIG. 3 shows a block diagram of an equipment RFID tag according to an exemplary embodiment of the present invention.

As shown in FIG. 3, the equipment RFID tag 200 includes an equipment RFID tag antenna 210, an equipment RFID tag chip 220, and a sensor 230.

The sensor 230 measures a used state of corresponding equipment and transmits the measured result to the equipment RFID tag chip 220. Here, the sensor 230 is applicable to a current/voltage measuring sensor for measuring the current or voltage existing in the corresponding equipment and generating information on the usage state of the corresponding equipment from the measured result. In addition, the sensor 230 is applicable to a temperature sensor for measuring the temperature of the corresponding equipment and generating information on the usage state of the corresponding equipment from the measured result. In this instance, when the sensor 230 is applied as a temperature sensor, it generates information indicating that the corresponding equipment is not in use when the temperature approaches room temperature, and it generates information indicating that the corresponding equipment is in use when the temperature is greater than room temperature.

The equipment RFID tag chip 220 stores equipment information including identification information of corresponding equipment, position information, and usage state information.

The equipment RFID tag antenna 210 transmits equipment information stored in the equipment RFID tag chip 220 to the equipment information collecting device 300 in reaction to the radio frequency signal for requesting equipment information transmitted by the equipment information collecting device 300.

Hereinafter, a detailed exemplary embodiment for the equipment information collecting device 300 and a method for the equipment inspecting device 100 to inspect equipment will be described.

An equipment information collecting device according to the first exemplary embodiment of the present invention, an equipment inspecting device, and an equipment inspecting method using the same will now be described.

Figure 4:
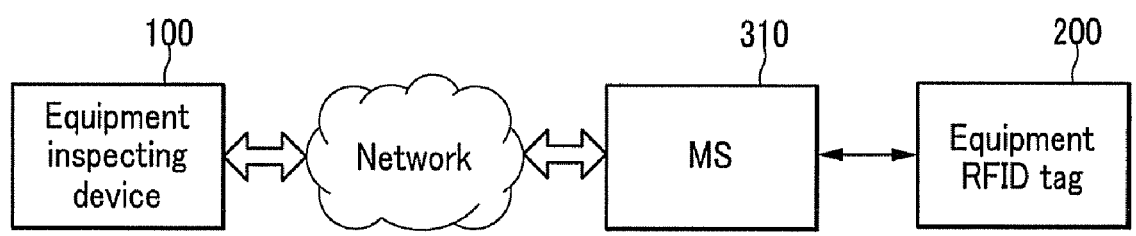
FIG. 4 shows a schematic diagram of an equipment inspecting device according to a first exemplary embodiment of the present invention.

FIG. 4 shows a schematic diagram of an equipment inspecting device according to a first exemplary embodiment of the present invention.

As shown in FIG. 4, the equipment inspecting device 100 inspects equipment in cooperation with the equipment information collecting device 300 realized with part of a mobile station 310.

The mobile station 310 according to the first exemplary embodiment collects equipment information from the equipment RFID tag 200 corresponding to the equipment.

Figure 5:
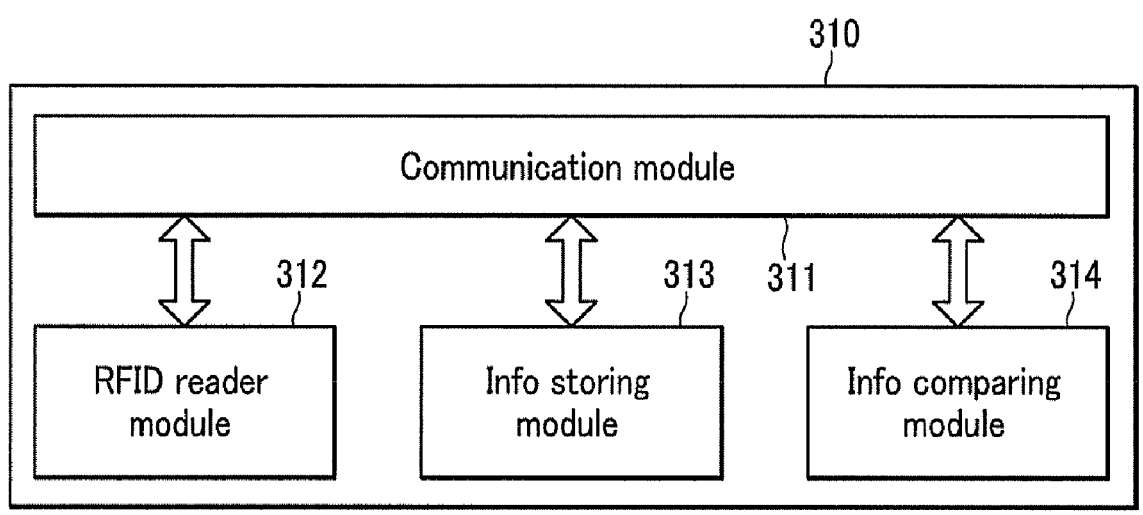
FIG. 5 shows a block diagram of a mobile station according to a first exemplary embodiment of the present invention.

FIG. 5 shows a block diagram of a mobile station according to a first exemplary embodiment of the present invention. FIG. 5 shows blocks so as to describe the first exemplary embodiment of the present invention from the mobile station 310.

As shown in FIG. 5, the mobile station 310 includes a communication module 311, an RFID reader module 312, an information storing module 313, and an information comparing module 314.

The communication module 311 transmits/receives information to/from the communication server 110 of the equipment inspecting device 100 through the radio frequency communication network. That is, the communication module 311 transmits building information, office information, and update information to the communication server 110 of the equipment inspecting device 100, and receives office equipment information from the communication server 110 of the equipment inspecting device 100.

The RFID reader module 312 reads equipment information stored in the equipment RFID tag 200. That is, the RFID reader module 312 transmits the radio frequency signal for requesting equipment information stored in the RFID tag chip 220 to the RFID tag antenna 210, and receives the equipment information stored in the RFID tag chip 220 from the RFID tag antenna 210.

The information storing module 313 temporarily stores the drawing information or office equipment information provided by the equipment inspecting device 100.

The information comparing module 314 compares the office equipment information stored by the information storing module 313 and the equipment information received by the RFID reader module 312 from the equipment RFID tag 200, and generates update information from the comparison result. The information comparing module 314 transmits the generated update information to the equipment inspecting device 100 through the communication module 311.

Figure 6:
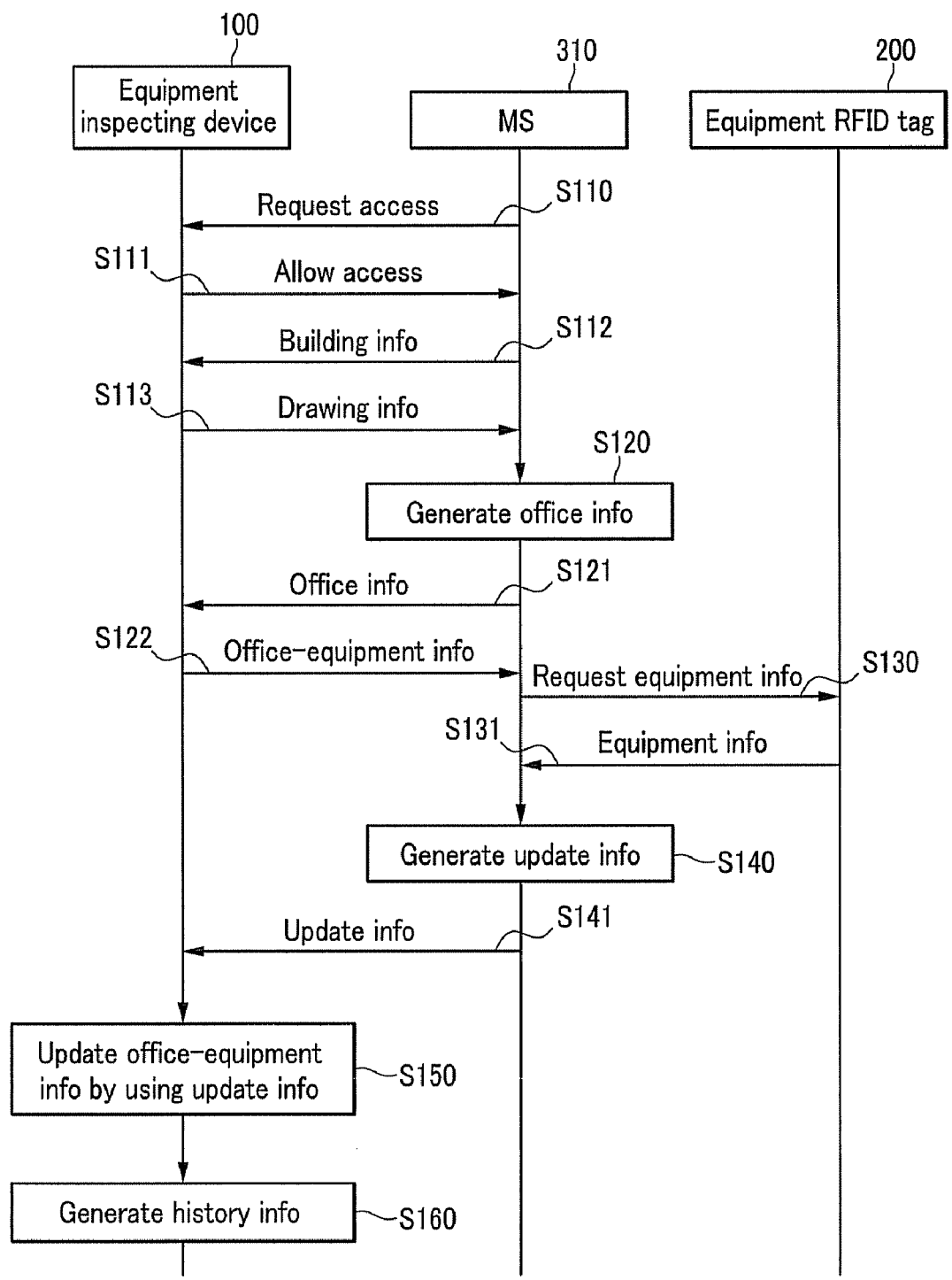
FIG. 6 shows a flowchart of an equipment inspecting method according to a first exemplary embodiment of the present invention.

FIG. 6 shows a flowchart of an equipment inspecting method according to a first exemplary embodiment of the present invention.

First, the inspector with the mobile station 310 is positioned in an office for equipment inspection.

As shown in FIG. 6, the communication module 311 of the mobile station 310 transmits an access request to the equipment inspecting device 100 through the radio frequency communication network (S110). The equipment inspecting device 100 receives an access request transmitted by a random mobile station 310, and reviews the access request to determine whether to allow or disallow the access.

The communication server 110 of the equipment inspecting device 100 transmits an access allowance corresponding to the access request transmitted by the mobile station 310 through the radio frequency communication network to the mobile station 310 (S111).

According to the first exemplary embodiment, the communication module 311 of the mobile station 310 having received the access allowance transmits building information for indicating an address of the building in which an office the equipment of which will be inspected is located according to the inspector's designation to the communication server 110 of the equipment inspecting device 100 (S112).

When the communication server 110 of the equipment inspecting device 100 receives building information from the mobile station 310, the building searcher 141 of the building drawing server 140 of the equipment inspecting device 100 searches drawing information corresponding to the building information received by the communication server 110 from among drawing information stored in the drawing database 142. The building searcher 141 transmits the drawing information to the mobile station 310 through the communication server 110 (S113).

When the communication module 311 of the mobile station 310 receives drawing information from the equipment inspecting device 100, the mobile station 310 displays drawing information to the inspector. Through this, the inspector recognizes drawing information, and recognizes the position of an office in which the equipment will be inspected based on the drawing information. The inspector inputs control information for generating office information to the mobile station 310 according to the recognition result.

The mobile station 310 generates office information corresponding to an office by using the control information input by the inspector having recognized the drawing information (S120). The communication module 311 of the mobile station 310 transmits the office information to the equipment inspecting device 100 (S121).

When the communication server 110 of the equipment inspecting device 100 receives the office information from the mobile station 310, the equipment searcher 121 of the equipment information server 120 of the equipment inspecting device 100 searches office equipment information corresponding to the office information received by the communication server 110 from among the office equipment information stored in the office equipment database 122. The equipment searcher 121 transmits the office equipment information to the mobile station 310 through the communication server 110 (S122).

The information storing module 313 of the mobile station 310 stores the office equipment information provided by the equipment inspecting device 100 through the communication module 311.

The RFID reader module 312 of the mobile station 310 transmits a radio frequency signal for requesting equipment information to at least one equipment RFID tag 200 positioned in an office (S130). The RFID reader module 312 of the mobile station 310 receives at least one piece of equipment information from at least one equipment RFID tag 200 reacting to the radio frequency signal (S131).

The information comparing module 314 of the mobile station 310 compares the office equipment information stored in the information storing module 313 and at least one piece of equipment information read by the RFID reader module 312. Through the comparison, the information comparing module 314 detects a difference between the office equipment information and the at least one piece of equipment information to generate update information for indicating a state change of at least one piece of equipment (S140). The information comparing module 314 of the mobile station 310 transmits the update information to the equipment inspecting device 100 through the communication module 311 (S141).

When the communication server 110 of the equipment inspecting device 100 receives update information from the mobile station 310, the information updater 131 of the control server 130 of the equipment inspecting device 100 uses the update information received by the communication server 110 to update the office equipment information stored in the office equipment database 122. That is, the information updater 131 modifies the office equipment information to apply the update information, and stores the modified office equipment information in the office equipment database 122 (S150).

Also, the information updater 131 generates history information for indicating the updated state of office equipment information according to update information (S160), and stores the history information in the information history database 132.

Accordingly, the equipment inspecting device 100 according to the first exemplary embodiment of the present invention receives update information for showing the state change of at least one piece of equipment positioned in each office from the inspector's mobile station 310, uses the update information to inspect the equipment corresponding to the corresponding office, and separately stores the result (history information) generated by equipment inspection. The mobile station 310 receives office equipment information for indicating the previous state from the equipment inspecting device 100 and collects equipment information from the equipment RFID tag 200 to generate update information from the comparison between the office equipment information and the historical equipment information.

Hence, according to the first exemplary embodiment of the present invention, the time and manpower used for equipment inspection and the cost are reduced compared to the existing passive equipment inspection method.

An equipment information collecting device, an equipment inspecting device, and an equipment inspecting method using the same according to a second exemplary embodiment of the present invention will now be described.

Figure 7:
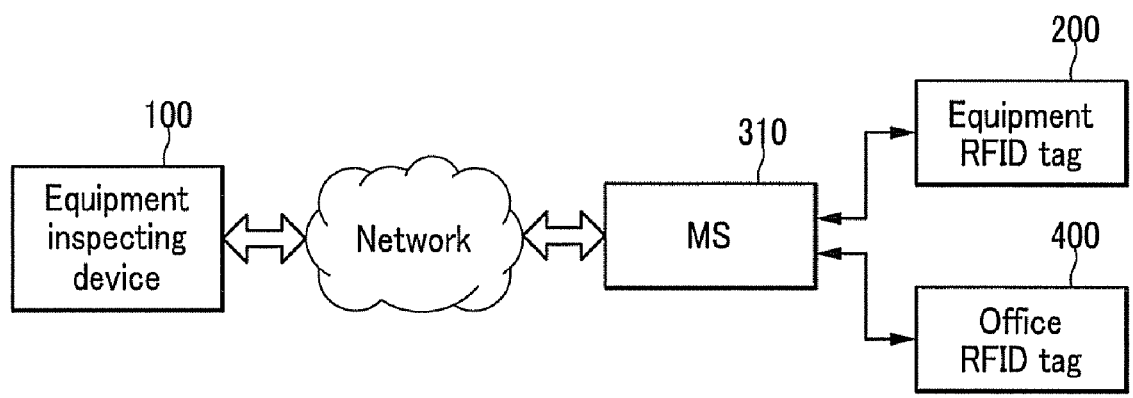
FIG. 7 shows a schematic diagram of an equipment inspecting device according to a second exemplary embodiment of the present invention.

FIG. 7 shows a schematic diagram of an equipment inspecting device according to a second exemplary embodiment of the present invention.

As shown in FIG. 7, the equipment inspecting device 100 inspects equipment in cooperation with the equipment information collecting device 300 realized by a configuration of the mobile station 310.

The mobile station 310 collects office information from an office RFID tag 400 corresponding to each office, and collects equipment information from the equipment RFID tag 200 corresponding to each piece of equipment.

Here, the office RFID tag 400 represents an office information storing device. That is, the office RFID tag 400 corresponds to at least one office included in the equipment inspection target, and it is attached or positioned in a place in the office.

Figure 8:
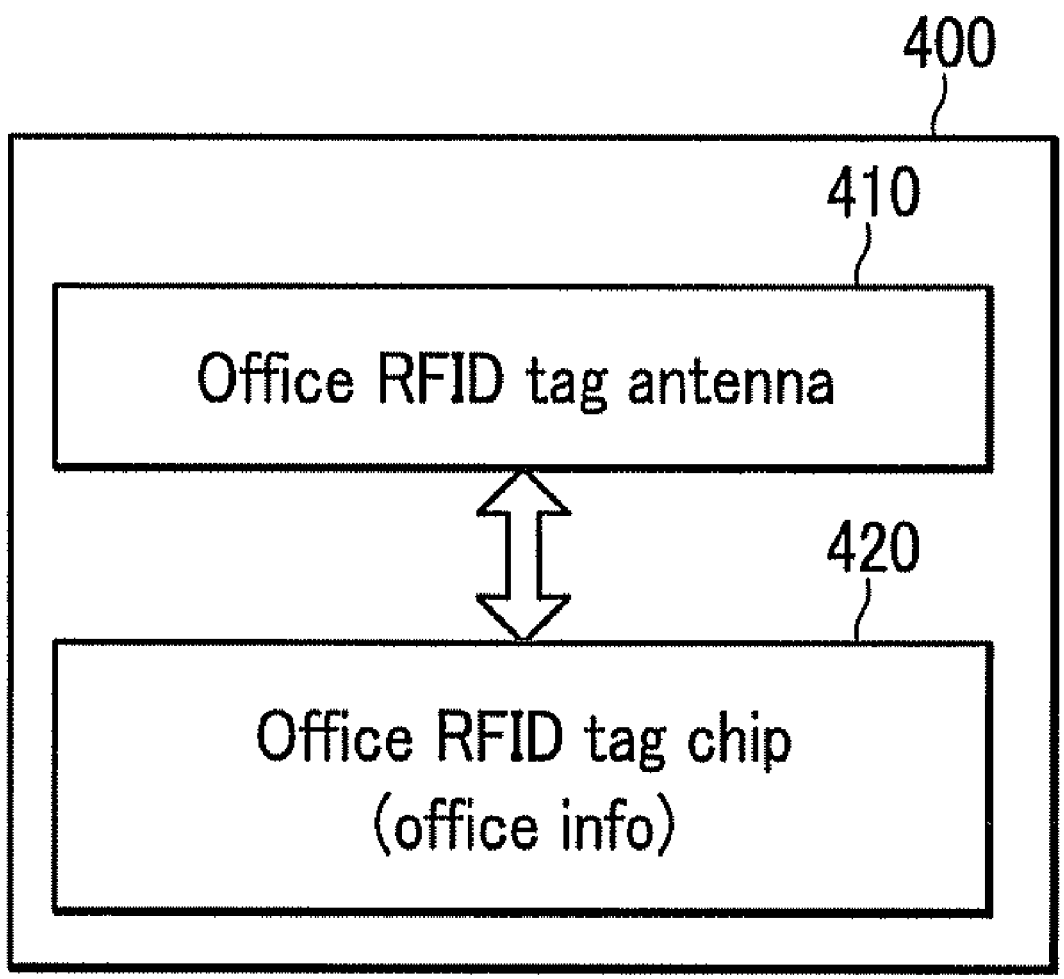
FIG. 8 shows a block diagram of an office RFID tag according to a second exemplary embodiment of the present invention.

FIG. 8 shows a block diagram of an office RFID tag 400 according to a second exemplary embodiment of the present invention. As shown in FIG. 8, the office RFID tag 400 includes an office RFID tag antenna 410 and an office RFID tag chip 420 for storing office information.

The mobile station 310 includes a communication module 311, an RFID reader module 312, an information storing module 313, and an information comparing module 314 as described in the first exemplary embodiment and FIG. 5.

Here, no repeated description on the communication module 311, the information storing module 313, and the information comparing module 314 will be provided since they correspond to those of the first exemplary embodiment.

According to the second exemplary embodiment, the RFID reader module 312 of the mobile station 310 reads equipment information stored in at least one equipment RFID tag 200 corresponding to at least one piece of equipment positioned in the office and office information stored in the office RFID tag 400.

Also, since the descriptions on the equipment inspecting device 100 and the equipment RFID tag 200 according to the second exemplary embodiment correspond to those of the above-described FIG. 2 and FIG. 3, no repeated descriptions will be provided.

Figure 9:
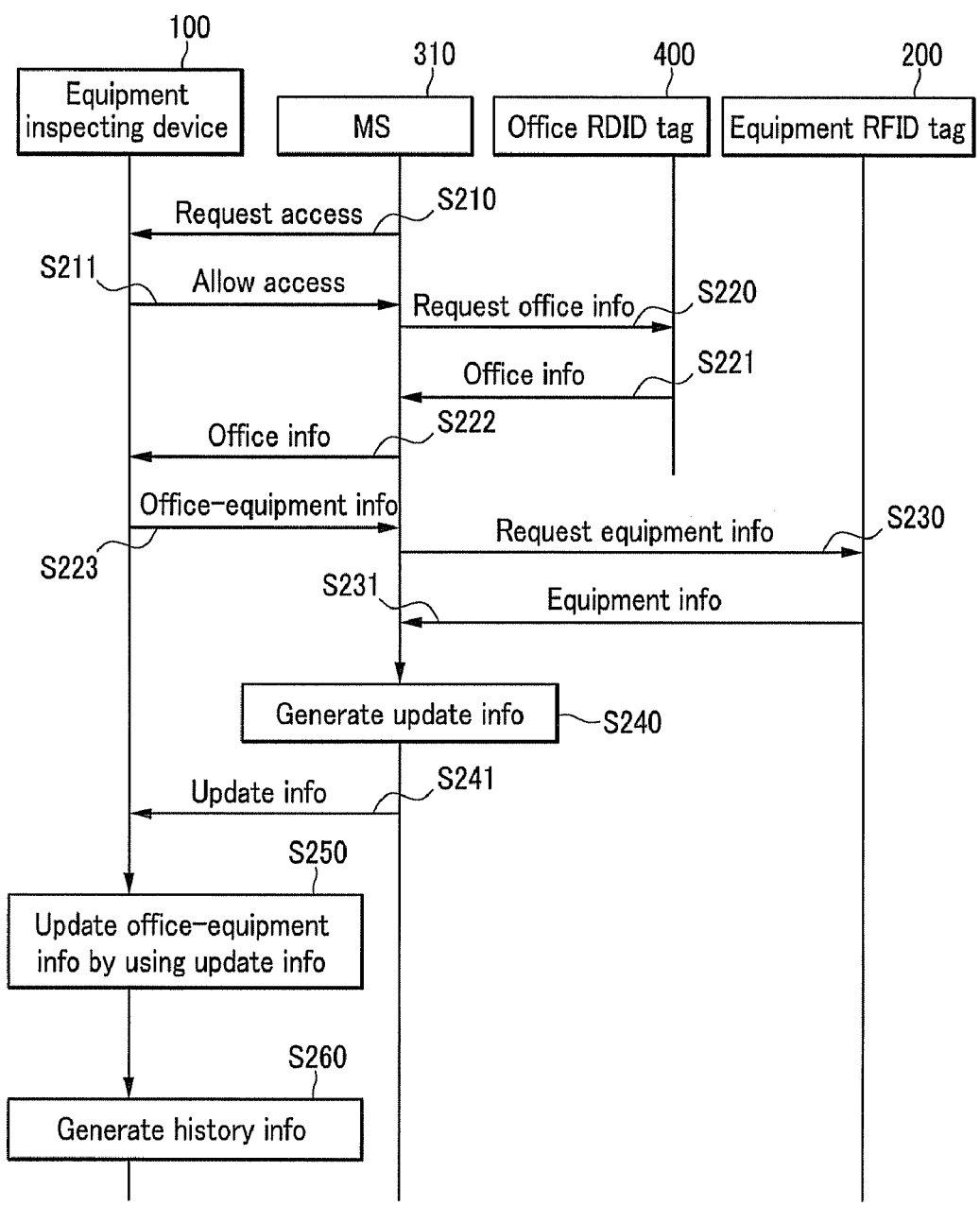
FIG. 9 shows a flowchart of an equipment inspecting method according to a second exemplary embodiment of the present invention.

FIG. 9 shows a flowchart of an equipment inspecting method according to the second exemplary embodiment of the present invention.

The mobile station 310 does not generate office information by using drawing information stored in the drawing database 142 of the building drawing server 140 of the equipment inspecting device 100 in a like manner of the first exemplary embodiment, but rather collects office information from the office RFID tag 400 corresponding to each office.

That is, as shown in FIG. 9, the mobile station 310 positioned in an office for inspecting equipment uses the communication module 311 to transmit an access request to the equipment inspecting device 100 through the radio frequency communication network (S210). The communication server 110 of the equipment inspecting device 100 receives the access request from the mobile station 310, and the equipment inspecting device 100 determines whether to allow or disallow the access for the received access request.

The communication server 110 of the equipment inspecting device 100 transmits an access allowance corresponding to the access request transmitted by the mobile station 310 through the radio frequency communication network to the mobile station 310 (S211).

When the communication module 311 of the mobile station 310 receives the access allowance, the RFID reader module 312 of the mobile station 310 transmits a radio frequency signal for indicating an office information request to the office RFID tag 400 corresponding to an office (S220). The RFID reader module 312 receives office information corresponding to an office from the office RFID tag 400 reacting to the radio frequency signal of the office information request (S221).

The communication module 311 of the mobile station 310 transmits the office information received by the RFID reader module 312 to the equipment inspecting device 100 (S222).

When the communication server 110 of the equipment inspecting device 100 receives the office information, the equipment information server 120 of the equipment inspecting device 100 transmits office equipment information corresponding to the office information received by the communication server 110 to the mobile station 310 through the communication server 110 (S223).

The information storing module 313 of the mobile station 310 stores the office equipment information received by the communication module 311 from the equipment inspecting device 100.

The RFID reader module 312 of the mobile station 310 transmits a radio frequency signal for indicating an equipment information request to at least one equipment RFID tag 200 positioned in an office (S230). The RFID reader module 312 receives at least one piece of equipment information from at least one equipment RFID tag 200 having reacted to the radio frequency signal (S231).

The information comparing module 314 of the mobile station 310 compares the office information received by the communication module 311 and at least one piece of equipment information received by the RFID reader module 312. Through the comparison, the information comparing module 314 generates update information for indicating the state change of at least one piece of equipment based on the difference between the office information and the at least one piece of equipment information (S240). The information comparing module 314 transmits the update information to the equipment inspecting device 100 through the communication module 311 (S241).

When the communication server 110 of the equipment inspecting device 100 receives the update information, the control server 130 of the equipment inspecting device 100 uses the update information to update the office equipment information stored in the equipment information server 120 (S250). The control server 130 generates history information for indicating an update history of the office equipment information (S260), and stores the history information in the information history database 132.

Accordingly, according to the second exemplary embodiment of the present invention, since the mobile station 310 recognizes the office information by using the office RFID tag 400 corresponding to each office, the equipment inspecting device 100 does not need to include the building drawing server 140 for storing drawing information in connection with the building information. Hence, since the inspector does not need to recognize the building information and there is no need to transmit/receive drawing information, the time used for inspecting equipment is reduced compared to the first exemplary embodiment.

The mobile station 310 according to the first exemplary embodiment or the second exemplary embodiment of the present invention can be a device for transmitting/receiving data by using a radio frequency network, and includes a PDA, a mobile phone, and a laptop computer.

An equipment information collecting device, an equipment inspecting device, and an equipment inspecting method using the same according to a third exemplary embodiment of the present invention will now be described.

Figure 10:
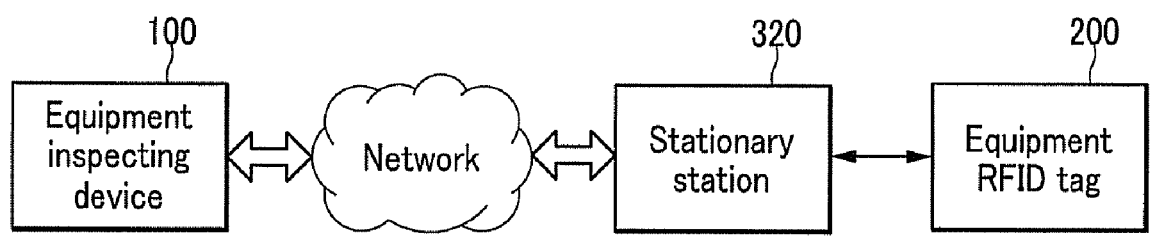
FIG. 10 shows a schematic diagram of an equipment inspecting device according to a third exemplary embodiment of the present invention.

FIG. 10 shows a schematic diagram of an equipment inspecting device according to the third exemplary embodiment of the present invention.

As shown in FIG. 10, the equipment inspecting device 100 inspects equipment in cooperation with the equipment information collecting device 300 realized with a stationary terminal 320.

Here, the stationary terminal 320 corresponds to at least one office included in the equipment inspection target, and it is attached or positioned at a place in the office.

Figure 11:
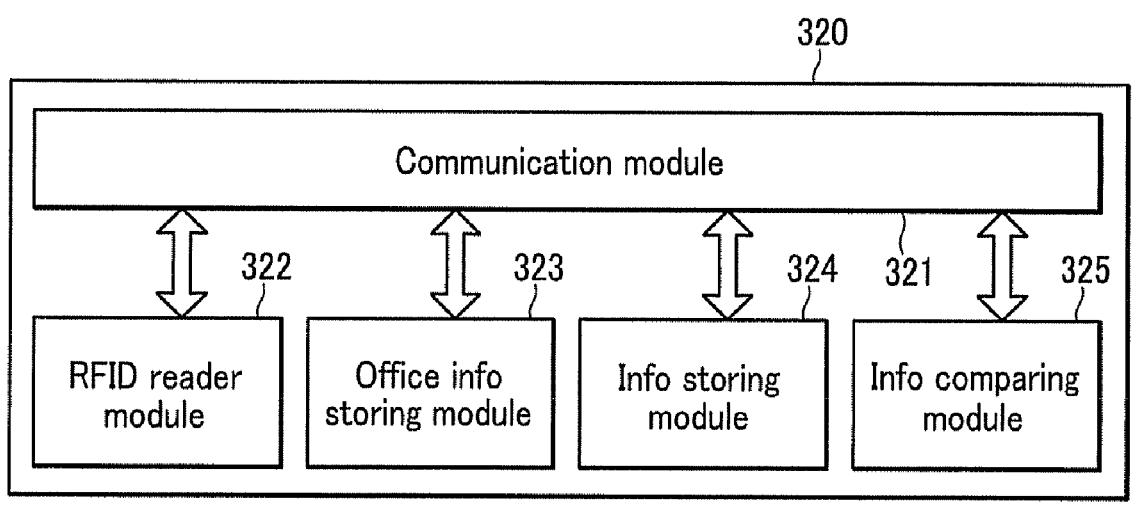
FIG. 11 shows a stationary communication terminal according to a third exemplary embodiment of the present invention.

FIG. 11 shows a block diagram of a stationary terminal according to the third exemplary embodiment of the present invention. FIG. 11 illustrates some needed blocks so as to describe the third exemplary embodiment of the present invention from the stationary terminal 320.

As shown in FIG. 11, the stationary terminal 320 includes a communication module 321, an RFID reader module 322, an office information storing module 323, an information storing module 324, and an information comparing module 325.

In a like manner of the communication module 311 of the mobile station 310, the communication module 321 transmits/receives information to/from the communication server 110 of the equipment inspecting device 100 through the radio frequency communication network.

In a like manner of the RFID reader module 312 of the mobile station 310, the RFID reader module 322 reads equipment information stored in the equipment RFID tag 200. That is, the RFID reader module 322 transmits the radio frequency signal for requesting equipment information stored in the equipment RFID tag chip 220 to the equipment RFID tag antenna 210, and receives the equipment information stored in the RFID tag chip 220 from the equipment RFID tag antenna 210.

The office information storing module 323 stores office information corresponding to the corresponding office in a like manner of the office RFID tag chip 420 of the office RFID tag 400.

The information storing module 324 stores the office equipment information received by the communication module 321 from the equipment inspecting device 100.

The information comparing module 325 compares the office equipment information stored by the information storing module 324 and the at least one piece of equipment information read by the RFID reader module 322 to generate update information.

The stationary terminal 320 can be positioned at a place in the office, and devices for transmitting/receiving data through the radio frequency communication network are applicable thereto.

Figure 12:
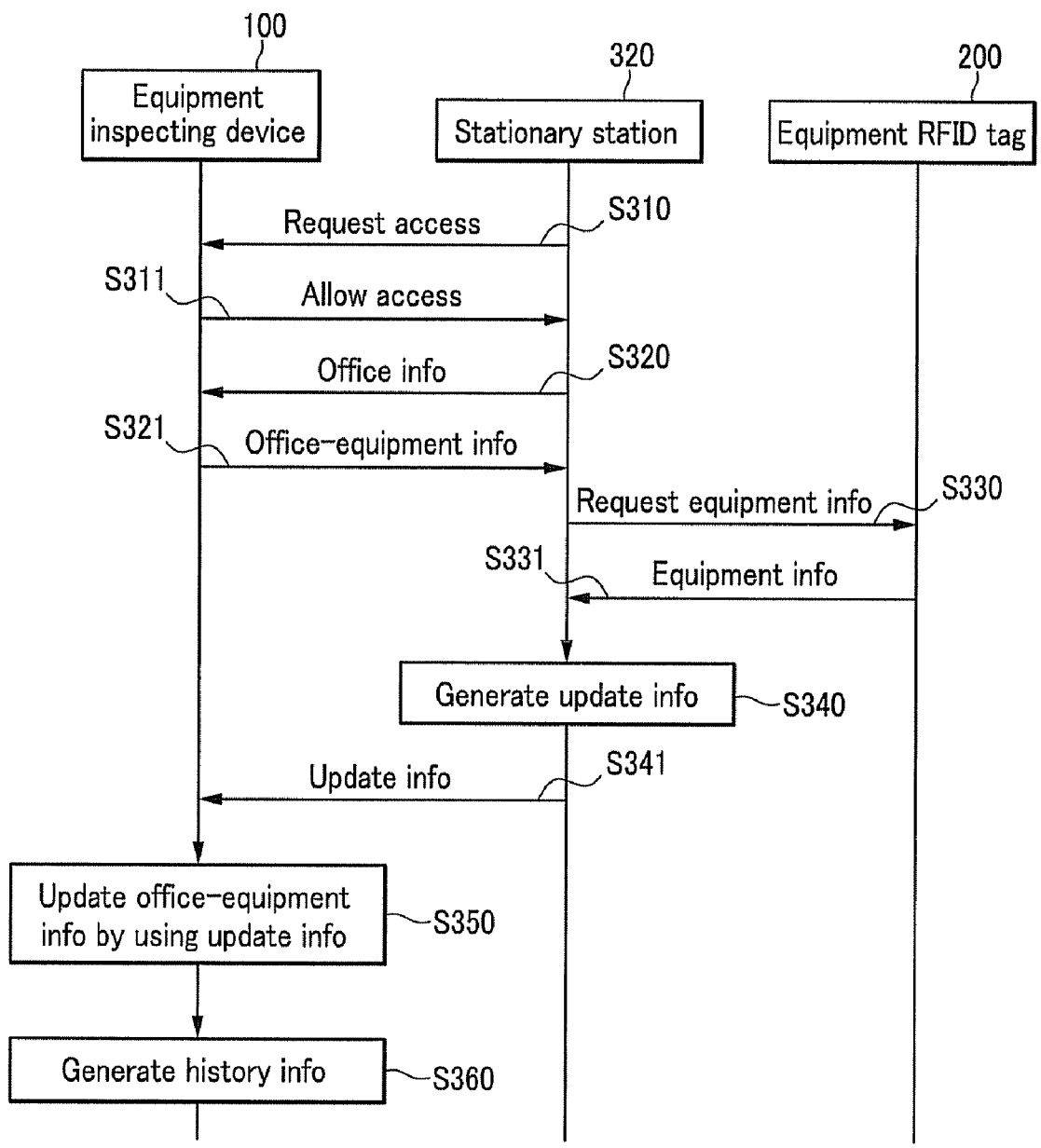
FIG. 12 shows a flowchart of an equipment inspecting method according to a third exemplary embodiment of the present invention.

FIG. 12 shows a flowchart of an equipment inspecting method according to the third exemplary embodiment of the present invention.

According to the third exemplary embodiment, the stationary terminal 320 positioned in an office periodically generates update information following equipment inspection according to the inspector's setting or irregularly according to the inspector's on-off control and transmits it to the equipment inspecting device 100.

The communication module 321 of the stationary terminal 320 transmits an access request to the equipment inspecting device 100 through the radio frequency communication network according to a rule predetermined by the inspector (S310).

When the communication server 110 of the equipment inspecting device 100 receives the access request from the stationary terminal 320, the equipment inspecting device 100 determines whether to allow or disallow the access in correspondence to the access request.

The communication server 110 of the equipment inspecting device 100 transmits an access allowance corresponding to the access request transmitted by a stationary terminal 320 through the radio frequency communication network to the stationary terminal 320 (S311).

When the communication module 321 of the stationary terminal 320 receives the access allowance from the equipment inspecting device 100, the office information storing module 323 of the stationary terminal 320 transmits office information corresponding to an office to the equipment inspecting device 100 through the communication module 321 (S320).

When the communication server 110 of the equipment inspecting device 100 receives the office information, the equipment information server 120 of the equipment inspecting device 100 transmits office equipment information corresponding to the office information received by the communication server 110 to the stationary terminal 320 (S321).

When the communication module 321 of the stationary terminal 320 receives the office information, the RFID reader module 322 of the stationary terminal 320 transmits a radio frequency signal for indicating an equipment information request to at least one equipment RFID tag 200 positioned in an office (S330). The RFID reader module 322 receives at least one piece of equipment information from at least one equipment RFID tag 200 reacting to the radio frequency signal (S331).

The information comparing module 325 of the stationary terminal 320 compares the office equipment information stored in the information storing module 324 and the at least one piece of equipment information read by the RFID reader module 322. Through the comparison, the information comparing module 325 of the stationary terminal 320 generates update information for indicating the state change of at least one piece of equipment based on the difference between the office information and the at least one piece of equipment information (S340). The information comparing module 325 transmits the update information to the equipment inspecting device 100 through the communication module 321 (S341).

When the communication server 110 of the equipment inspecting device 100 receives update information, the control server 130 of the equipment inspecting device 100 applies update information to the office equipment information stored in the office equipment database 122 of the equipment information server 120. That is, the control server 130 uses the update information to update the office equipment information (S350). The control server 130 generates history information for indicating an update history of the office equipment information (S360), and stores the history information in the information history database 132.

The equipment inspecting device according to the third exemplary embodiment of the present invention inspects equipment in cooperation with at least one stationary terminal 320 corresponding to at least one office included in the equipment inspection target. Here, the stationary terminal 320 generates update information for inspecting equipment periodically or irregularly according to the inspector's setting. Accordingly, since the inspector having an equipment information collecting device does not need to visit the office corresponding to the equipment inspection target, undesired waste of manpower is reduced compared to the first exemplary embodiment or the second exemplary embodiment.

According to the exemplary embodiment of the present invention, the equipment inspecting method and device collects information corresponding to equipment by using a radio frequency identification tag so that it can inspect equipment that does not always provide a network system, and it reduces time, manpower, and costs for inspecting equipment. Also, since the equipment inspecting method and device according to the exemplary embodiment of the present invention separately stores history information for showing consecutive state changes of equipment, the history information can be used as a numerical basis for establishing an equipment import plan.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for an equipment inspecting device to inspect at least one piece of equipment positioned in an office from among a plurality of offices included in an equipment inspection target, the method comprising:
   recognizing office information for indicating a position of the office;
   searching office equipment information for indicating a previous state of at least one piece of equipment positioned in the office by using the recognized office information;
   transmitting the searched office equipment information to an equipment information collecting device that collects at least one piece of equipment information corresponding to the at least one piece of equipment;
   receiving update information from the equipment information collecting device, the update information indicating a state change of the at least one piece of equipment; and
   updating the office equipment information by using the update information.

2. The method of claim 1, wherein
the at least one piece of equipment information is stored in at least one radio frequency identification tag corresponding to the at least one piece of equipment.

3. The method of claim 2, wherein
the at least one piece of equipment information includes:
identification information for identifying the corresponding equipment;
position information for indicating a position of the corresponding equipment in the office; and
current usage information for indicating a current usage state of the corresponding equipment.

4. The method of claim 2, wherein
the recognizing of office information includes:
receiving building information for indicating an address of the building in which the office is positioned from the equipment information collecting device;
searching drawing information corresponding to the received building information from among a plurality of pieces of drawing information for indicating blueprints of at least one building in which the plurality of offices are positioned;
transmitting the searched drawing information to the equipment information collecting device; and
receiving the office information from the equipment information collecting device, the office information being generated based on the searched drawing information.

5. The method of claim 2, wherein
the recognizing of office information includes
receiving the office information from the equipment information collecting device having received the office information stored in an office radio frequency identification tag corresponding to the office.

6. The method of claim 2, wherein
the recognizing of office information includes
receiving the office information stored by the equipment information collecting device positioned in the office from the equipment information collecting device.

7. The method of claim 1, further comprising
generating history information for indicating a history for updating the office equipment information according to the update information.

8. A device for inspecting equipment corresponding to a plurality of offices included in an equipment inspecting target, the device comprising:
   a communication server for inspecting equipment in cooperation with an equipment information collecting device and transmitting/receiving information to/from the equipment information collecting device through a radio frequency communication network, the equipment information collecting device collecting at least one piece of equipment information stored in at least one equipment radio frequency identification tag corresponding to at least one piece of equipment positioned in each office and generating update information for indicating a state change of the at least one piece of equipment;

an equipment information server for controlling a plurality of pieces of office equipment information for indicating a previous state of at least one piece of equipment positioned in each office corresponding to the plurality of offices; and a control server for updating the office equipment information stored in the equipment information server according to the update information received from the equipment information collecting device through the communication server.

9. The device of claim 8, wherein
the equipment information server includes:
an office equipment database for storing the plurality of pieces of office equipment information; and
an equipment searcher for receiving office information for indicating a position of an office selected for inspecting equipment from among the plurality of offices from the equipment information collecting device through the communication server, searching office equipment information corresponding to the received office information from the office equipment database, and transmitting the searched office equipment information to the equipment information collecting device through the communication server.

10. The device of claim 9, wherein
the at least one piece of equipment information includes:
identification information for identifying the corresponding equipment;
position information for indicating a position of the corresponding equipment in the office; and
current usage information for indicating a current usage state of the corresponding equipment.

11. The device of claim 10, wherein
the update information is generated by comparing the at least one piece of equipment information received by the equipment information collecting device from the at least one equipment radio frequency identification tag and the office equipment information received from the equipment searcher.

12. The device of claim 11, wherein
the control server includes:

an information updater for applying the update information to a plurality of office equipment information stored in the office equipment database, and generating history information for indicating an update history of the office equipment information; and
a history database for storing the history information.

13. The device of claim 12, wherein
the equipment is inspected in cooperation with an equipment information collecting device realized with part of a mobile station positioned in the office.

14. The device of claim 13, further comprising a building drawing server including:
a drawing database for storing at least one piece of drawing information for indicating a design drawing of the at least one building so as to correspond to at least one piece of building information for indicating an address of at least one building in which the plurality of offices are positioned; and
a building searcher for receiving building information corresponding to a building in which the office is positioned from the equipment information collecting device through the communication server, searching drawing information corresponding to the received building information from the drawing database, and transmitting the searched drawing information to the equipment information collecting device through the communication server.

15. The device of claim 14, wherein
the office information is generated by using the drawing information received by the equipment information collecting device from the building searcher.

16. The device of claim 14, wherein
the office information is received by the equipment information collecting device from an office radio frequency identification tag corresponding to the office from among a plurality of office radio frequency identification tags corresponding to the plurality of offices.

17. The device of claim 12, wherein
equipment of the office is inspected in cooperation with an equipment information collecting device corresponding to the office from among a plurality of equipment information collecting devices corresponding to the plurality of offices.

18. The device of claim 17, wherein
the office information is stored in the equipment information collecting device corresponding to the office.

* * * * *